(12) United States Patent
Wandschneider

(10) Patent No.: US 10,955,023 B2
(45) Date of Patent: Mar. 23, 2021

(54) DEVICE FOR TRIGGERING A GAS SPRING

(71) Applicant: Guido Wandschneider, Eschelbronn (DE)

(72) Inventor: Guido Wandschneider, Eschelbronn (DE)

( * ) Notice: Subject to any disclaimer, the term of this patent is extended or adjusted under 35 U.S.C. 154(b) by 202 days.

(21) Appl. No.: 15/750,214

(22) PCT Filed: Jul. 2, 2016

(86) PCT No.: PCT/DE2016/000264
§ 371 (c)(1),
(2) Date: Feb. 5, 2018

(87) PCT Pub. No.: WO2017/032351
PCT Pub. Date: Mar. 2, 2017

(65) Prior Publication Data
US 2018/0223938 A1 Aug. 9, 2018

(30) Foreign Application Priority Data
Aug. 25, 2015 (DE) .................... 10 2015 010 880.8

(51) Int. Cl.
*F16F 9/02* (2006.01)
*F16C 1/10* (2006.01)

(52) U.S. Cl.
CPC .......... *F16F 9/0263* (2013.01); *F16F 9/0245* (2013.01); *F16C 1/10* (2013.01); *F16F 2230/186* (2013.01)

(58) Field of Classification Search
CPC .. F16F 9/0263; F16F 9/0245; F16F 2230/183; F16F 9/38; F16F 9/56;
(Continued)

(56) References Cited

U.S. PATENT DOCUMENTS 3,711,054 A * 1/1973 Bauer .................. A47C 3/30
248/562
4,020,929 A * 5/1977 Goldin .................. F16F 9/54
188/321.11
(Continued)

FOREIGN PATENT DOCUMENTS

CN 101969814 A 2/2011
CN 104534006 A 4/2015
(Continued)

OTHER PUBLICATIONS

German Patent and Trademark Office, Search Report in Patent Application DE 10 2015 010 880.8, dated Jan. 7, 2016 (English Translation).
(Continued)

*Primary Examiner* — Jake Cook
*Assistant Examiner* — Gregory Robert Weber
(74) *Attorney, Agent, or Firm* — Smartpat PLC

(57) ABSTRACT

The invention relates to a device (10) for triggering a gas spring (1), comprising an actuating apparatus (2), an actuating element (4), which is operatively connected to the actuating apparatus (2) and acts on an end trigger (3) of the gas spring (1), and a housing (20), wherein the housing (20) has a gas-spring connection hole (70), by means of which the upper end region of the gas spring (1) can be connected with the trigger (3) fed through into the interior of the housing (20), the gas-spring connection hole (70) is designed a through-hole, and means for the clamping fixation of the upper end region of the gas spring (1) inserted into the hole are present, characterized in that the housing (20) has an open slot (60), which extends from the gas-spring connection hole (70) to the end outer face (66) of the housing (20) and over the length of the gas-spring connection hole (70) at least in some regions, a left and a right protruding side wall region (68.1, 68.2) are formed by means
(Continued)

of the slot (60), and the means for clamping and fixing are present in the region of the left and the right side wall regions (68.1, 68.2), which means for clamping and fixing clamp the left and the right side wall regions (68.1, 68.2) to each other, whereby a clamping force is applied to the end region of the gas spring (1) inserted into the gas-spring connection hole (70).

15 Claims, 5 Drawing Sheets

(58) Field of Classification Search
CPC ... F16F 9/3207; F16F 9/54; F16F 9/44; F16C 1/10; A47C 3/30
See application file for complete search history.

(56) References Cited

U.S. PATENT DOCUMENTS

| | | | | |
|---|---|---|---|---|
| 4,108,416 | A | * | 8/1978 | Nagase ............... A47C 3/30 248/566 |
| 4,139,175 | A | * | 2/1979 | Bauer ............... F16F 9/0245 248/404 |
| 4,280,602 | A | * | 7/1981 | Kloster ............... B60G 13/001 188/322.19 |
| 4,557,470 | A | * | 12/1985 | Link ............... A47C 3/30 267/64.12 |
| 6,220,582 | B1 | | 4/2001 | Wandschneider |
| 9,403,568 | B2 | * | 8/2016 | Tseng ............... B62J 1/06 |
| 2004/0028468 | A1 | * | 2/2004 | Wappes, II ............... B60G 7/001 403/290 |
| 2004/0091310 | A1 | * | 5/2004 | Bacskay ............... F16D 1/04 403/313 |
| 2004/0151538 | A1 | * | 8/2004 | Landwehr ............... F16B 37/0828 403/290 |
| 2008/0014015 | A1 | | 1/2008 | Brick |
| 2016/0160954 | A1 | | 6/2016 | Wandschneider |
| 2018/0146785 | A1 | | 5/2018 | Wandschneider |

FOREIGN PATENT DOCUMENTS

| | | | |
|---|---|---|---|
| DE | 1931012 A1 | 12/1970 | |
| DE | 3621489 A1 | 1/1988 | |
| DE | 19716720 | 3/2006 | |
| DE | 202013006582 U1 * | 8/2013 | ............ F16F 9/0263 |
| DE | 202013006582 U1 | 8/2013 | |
| DE | 202015003901 U1 | 7/2015 | |
| EP | 0907842 A1 | 4/1999 | |
| EP | 1328738 B1 | 12/2004 | |
| WO | 2009084915 A1 | 7/2009 | |

OTHER PUBLICATIONS

International Preliminary Report on Patentability (English Translation), Application PCT/DE2016/000264.

* cited by examiner

DEVICE FOR TRIGGERING A GAS SPRING

TECHNICAL FIELD

The present invention relates to a device for triggering a gas spring.

BACKGROUND

Gas springs are known from practice in a wide variety of embodiments. Many gas springs comprise an integrated valve system, whereby the gas spring can be fixed or locked infinitely variably in any position. In this case, the piston is sealed off at a pressure tube and separates two gas chambers from one another. When the valve is closed, the gas spring is arrested and allows locking in the desired position. By actuation of the trigger, usually embodied as a trigger tappet, the valve is opened and the gas spring can thus be positioned infinitely variably. The extending speed and damping can in this case be varied appropriately by choice of the nozzle in the piston.

Gas springs of the type in question here are used in a wide variety of ways. The use of such gas springs in office chairs is known from practice. Similarly, car seats or aircraft seats can be adjusted or parts of sunbeds can be moved by gas springs. Office desks can also be adjusted in height by gas springs.

The gas springs known from practice require an actuating element, which is operatively connected to an actuating device and acts directly on the trigger provided on the end side of the gas spring. In the case of office chairs, for example, this involves using actuating elements that take the form of simple levers which generally press directly on the trigger with an end-side region. Such a configuration of the actuating element has the great disadvantage that considerable forces are still required for triggering the gas spring. In addition to this there is the further disadvantage that it is only with difficulty that the triggering can be performed in stages, so that it is virtually impossible to regulate the speed of the gas spring under considerable triggering forces.

EP 0 907 842 B1 discloses a device for triggering a gas spring of the type mentioned at the beginning. Apart from the trigger lever, the actuating element of the known device also comprises two further levers, which are pivotably coupled to the trigger lever.

Furthermore, DE 197 16 720 A1 and EP 1 328 738 B1 disclose further devices for triggering a gas spring in which a lever mechanism is likewise used. In the case of the device known from DE 197 16 720 A1, there are two levers, which interact by way of a contact region. The operative connection between the levers is realized either by way of a toothing or by way of frictional surfaces lying against one another. The device according to EP 1 328 738 B1 is formed in such a way that the contact region and/or the actuating lever of the lever mechanism has a freely rotatable roller or ball for rolling on the actuating region and/or the contact region.

A device for triggering a gas spring according to the features of the preamble of claim 1 is known from DE 20 2013 006 582 U1. To secure the end region of the gas spring that is inserted into the housing, a threaded pin is screwed in via a transverse connection recess and acts directly on the end region of the gas spring.

SUMMARY

The present disclosure relates to a device for triggering a gas spring, comprising an actuating device, an actuating element, which is operatively connected to the actuating device and acts on an end-side trigger of the gas spring, wherein the actuating element acts directly or indirectly on the trigger and is formed in particular as a lever arrangement, which reduces or increases the transmitted force and/or displacement, comprises an actuating lever and is in operative connection with the actuating device, and at least with one trigger lever, which interacts directly or indirectly with the actuating lever and acts on the trigger, and a housing, wherein the housing has a gas spring connection recess, via which the upper end region of the gas spring is connectable to the trigger, which is guided through said recess into the interior of the housing, the gas spring connection recess is designed as a continuous recess, in particular with an internal thread, and there is a clamping element for clamping and fixing the upper end region of the gas spring which is inserted into the recess.

Proceeding from the cited prior art, the present invention is based on the object or addresses the technical problem of configuring and developing a device for triggering a gas spring of the type mentioned at the beginning that can be used under a wide variety of geometrical space conditions of the surrounding components, can be produced cost-effectively, ensures a permanently reliable function, is formed in a space-saving manner and ensures a reliable compact connection of the gas spring with high precision.

The device according to the invention for triggering a gas spring is provided by the features of independent claim 1.

Advantageous refinements and developments are the subject matter of the claims that are directly or indirectly dependent on independent claim 1.

The device according to the invention for triggering a gas spring, which device ensures a compact realization with a simultaneously permanently reliable function, is distinguished in that the housing has an open slot which extends from the gas spring connection recess to the front outer side of the housing and extends at least in regions over the length of the gas spring connection recess, a left and right projecting side wall region are formed by the slot, the clamping and fixing element is present in the region of the left and right side wall region and braces the left and right side wall region together, as a result of which a clamping force is exerted on the end region of the gas spring that is inserted into the gas spring connection recess.

The device according to the invention is distinguished by a compact construction which can be produced economically and ensures a permanently reliable fixing of the end region of the gas spring after said end region is introduced into its precise end position within the gas spring connection recess.

According to an advantageous refinement, the clamping element is designed as releasable element.

A particularly advantageous development which ensures reliable clamping is distinguished in that the slot extends over the entire length of the gas spring connection recess, and therefore the elastic properties of the side wall regions ensure reliable clamping.

A structurally simple and advantageous refinement is distinguished in that in the region of the slot the left and right side wall region has a respective transverse opening aligned with each other and the clamping and fixing element is guided through the opening.

An advantageous refinement of a first variant embodiment is distinguished in that the clamping and fixing element is designed as a screw and the opening(s) has/have an internal thread in which the external thread of the screw engages in a meshing manner.

A particularly preferred refinement which permits a compact construction with a low construction volume is distinguished in that the screw ends on the outer side substantially with the outer wall of the left and right side wall region, and the screw head of the screw is arranged in a recess of a side wall region.

An advantageous second variant embodiment of the device according to the invention is distinguished in that the clamping and fixing element is designed as a screw with a nut, wherein, in an advantageous manner in order to ensure reliable clamping, the screw head of the screw and the nut each lie against the outer side of the left and right side wall region.

In order to facilitate the handling during the assembly or the installation, a particularly advantageous refinement is distinguished in that the screw head of the screw has a form-fitting internal contour for attaching a tool.

Further embodiments and advantages of the invention emerge from the features that are further presented in the claims and from the exemplary embodiments specified below. The features of the claims may be combined with one another in any desired way as long as they are not clearly not mutually exclusive.

BRIEF DESCRIPTION OF THE DRAWINGS

The invention and advantageous embodiments and developments of same are described and explained in more detail below with reference to the examples represented in the drawing. The features that can be taken from the description and the drawing may be applied according to the invention individually on their own or multiply in any desired combination. In the drawing.

DETAILED DESCRIPTION

Figure 9:
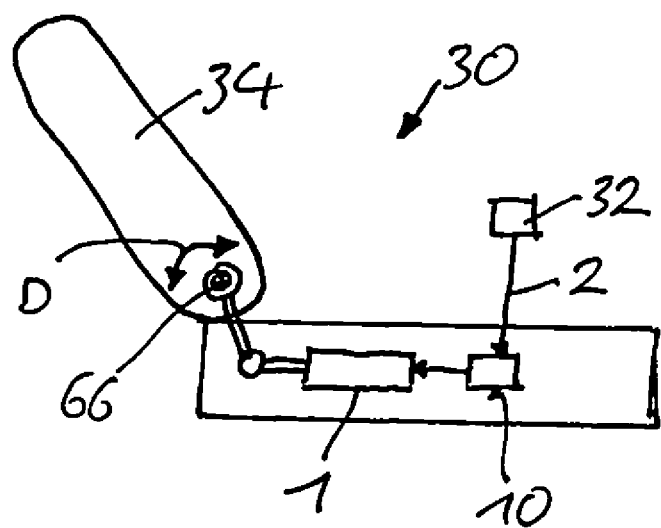
FIG. 9 shows a highly schematized illustration of an exemplary field of use of the device for triggering a gas spring for a seat with an adjustable backrest.

FIG. 9 illustrates in highly schematized form an exemplary case of use of a device 10 for triggering a gas spring 1 for a seat 30 with an adjustable backrest 34. The backrest 34 is mounted rotatably (arrow D) about an axis of rotation 66 and is coupled with the piston rod via a lever mechanism to the gas spring 1. In the non-activated state of the device 10, the gas spring 1 locks the rotational position of the backrest 34 via the lever mechanism. The device 10 is coupled to a switching unit 32 via an actuating device 2 and acts on the trigger of the gas spring. As soon as the switching unit 32 is actuated, the device 10 acts on the trigger of the gas spring, as a result of which a rotational movement D of the backrest 34 is activated. As soon as the switching unit 32 is deactivated, the gas spring 1 locks a further rotational movement D of the backrest 34.

A first exemplary embodiment of a device 10 for triggering a gas spring is illustrated schematically in FIGS. 1 to 4.

The device 10 has a housing 20.

In the left lower end edge region, the housing 20 has a first housing connection unit 22 which is designed as a recess 36 with an internal thread 38. The end region of an actuating device 2 is screwed into said recess 36 via an external thread 39, wherein the actuating device in the exemplary embodiment illustrated is designed as a Bowden cable having a cable 16. The cable 16 is guided into the interior of the housing 20 and connected to an actuating element 4 which is illustrated symbolically in the form of an arrow in the illustration of FIG. 1. The actuating element 4 is designed as a lever mechanism (not illustrated specifically) with an actuating lever and trigger lever, wherein the lever mechanism is known per se and is described, for example, in DE 20 2013 006 582 U1. The actuating element 4 acts on a trigger 3 of the gas spring 1, the trigger being present in the end region of the gas spring 1. The end region of the gas spring 1 is via a second housing connection unit 24, which is designed as a gas spring connection recess 70 with an internal thread 71, wherein, for the exact positioning in the second housing connection unit 24, the end region has an external thread 72 which is screwed into the internal thread 71 of the gas spring connection recess 70.

Figure 2:
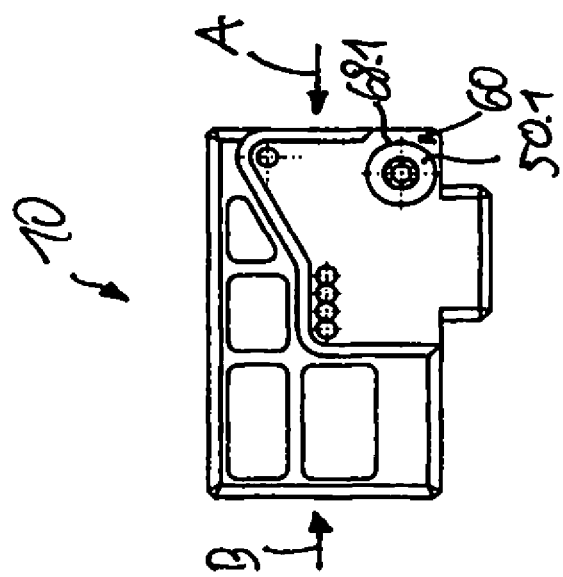
FIG. 2 shows a schematic side view of the device according to FIG. 1.
Figure 1:
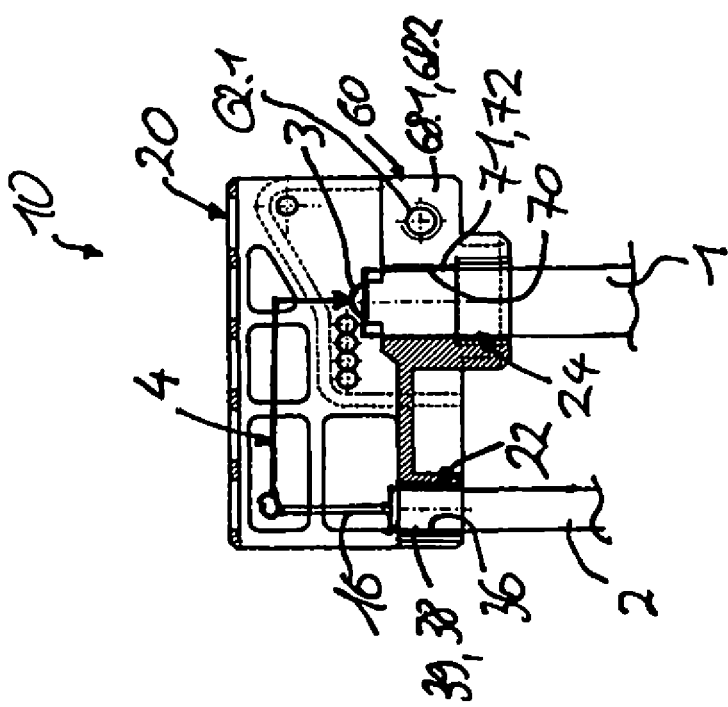
FIG. 1 shows a schematic longitudinal cross section through a first exemplary embodiment of a device for actuating a gas spring with a partial illustration of an actuating device, with the end region of a gas spring and an actuating element, which is illustrated symbolically in the form of an arrow, between the actuating device and the trigger in the end region of the gas spring.
Figure 4:
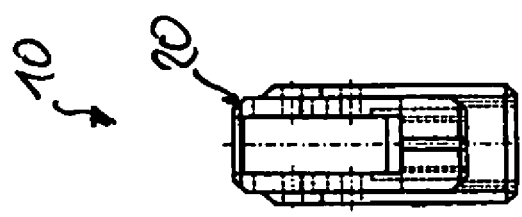
FIG. 4 shows a schematic end view of the device as seen in the direction of the arrow B of FIG. 2.
Figure 3:
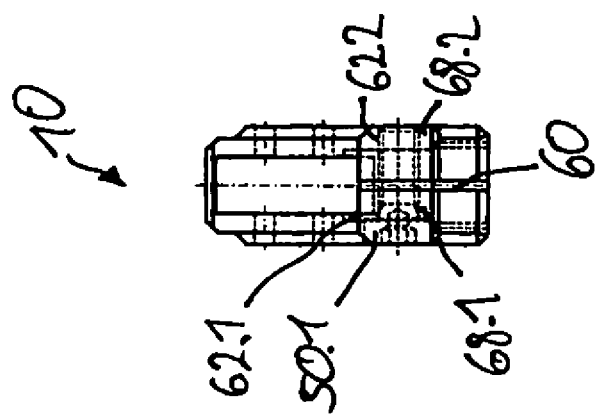
FIG. 3 shows a schematic end view of the device as seen in the direction of the arrow A of FIG. 2.
Figure 6:
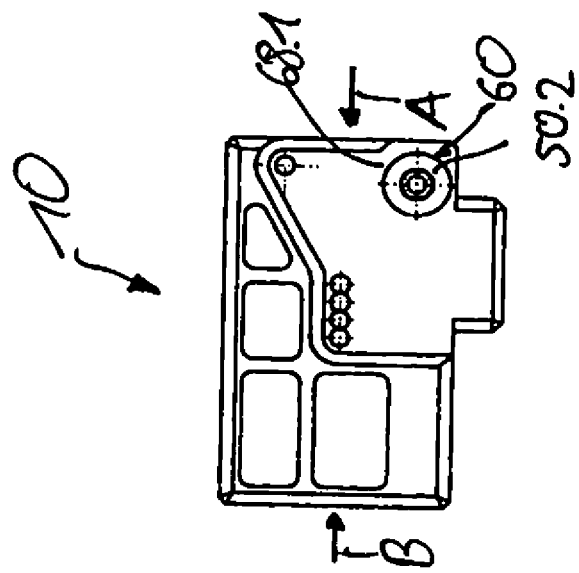
FIG. 6 shows a schematic side view of the device according to FIG. 5.
Figure 5:
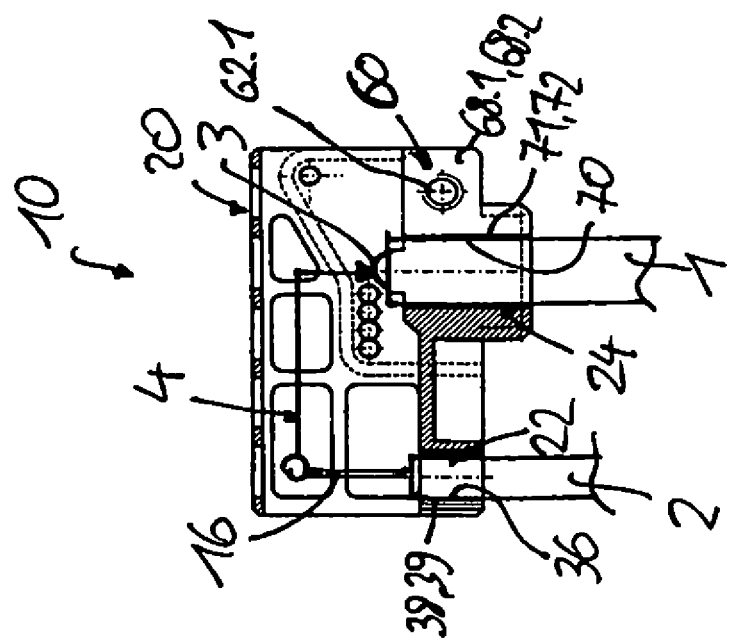
FIG. 5 shows a schematic longitudinal cross section through a second exemplary embodiment of a device for actuating a gas spring with a partial illustration of an actuating device, with the end region of a gas spring and an actuating element, which is illustrated symbolically in the form of an arrow, between the actuating device and the trigger in the end region of the gas spring.
Figure 7:
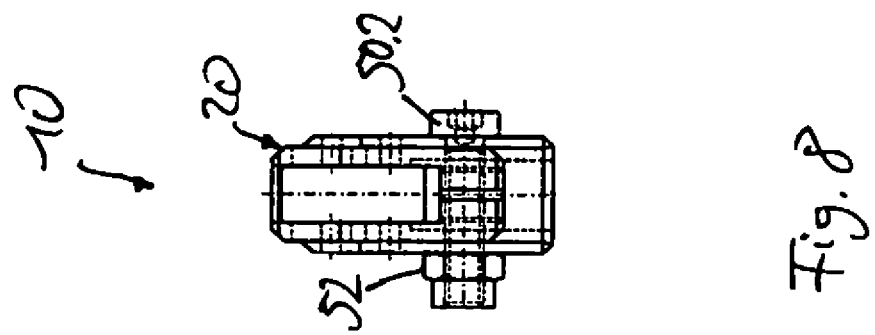
FIG. 7 shows a schematic end view of the device as seen in the direction of the arrow A of FIG. 6.
Figure 8:
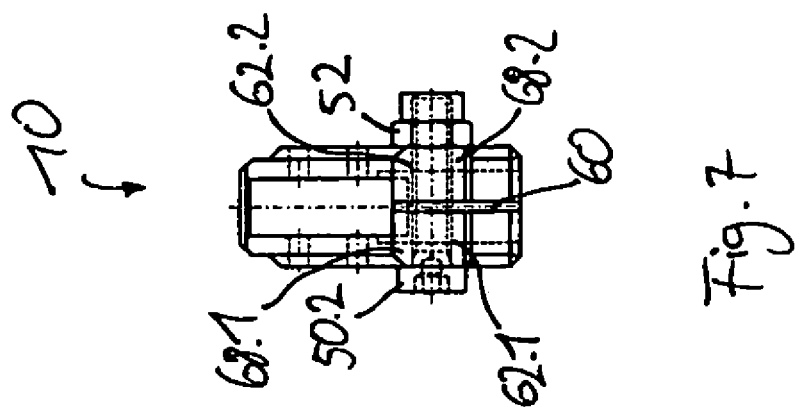
FIG. 8 shows a schematic end view of the device as seen in the direction of the arrow B of FIG. 6.

The housing 20 has a slot 60 which is present in a manner extending from the gas spring connection recess 70 of the second housing connection unit 24 as far as the end side on the right in FIG. 1, wherein said slot is present over the entire height of the second housing connection unit 24. As a result, a side wall region 68.1, 68.2 is in each case formed on both sides of the slot 60 which acts virtually as a cantilever plate. In each side wall region 68.1, 68.2 there is a continuous transverse recess 62.1, 62.2 which has an internal thread. A continuous threaded screw 50.1 is screwed into the two transverse recesses 62.1, 62.2 in the transverse direction. By means of the screwing in of the threaded screw 50.1, the two side wall regions 68.1, 68.2 are moved toward each other because of their elastic properties, and therefore, as a result, a clamping force acts on that end region of the gas spring 1 which is screwed into the second housing connection unit 24 and thereby reliably fixes the installed position of the gas spring within the housing 20.

A side wall region 68.1 has a step-shaped transverse recess 62.1 which is designed in such a manner that the threaded screw 50.1 does not project with its screw head beyond the outer side of the housing 20. The threaded screw 50.1 itself has a length in such a manner that, in the screwed-in state, said threaded screw does not project with its screw stem beyond the outer side of the housing 20. As a result, a compact construction which ensures a permanently reliable clamping function is possible.

To facilitate the installation, the screw head of the threaded screw 50.1 has an internal circumferential edge contour, for attaching a tool.

FIGS. 5 to 8 illustrate a second exemplary embodiment of a device for triggering a gas spring 1. This device 10 has in principle the same design as the device 10 according to FIGS. 1 to 4. Identical components bear the same reference sign and are not explained once again.

However, in contrast to the device 10 according to FIG. 1, the two transverse recesses 62.1, 62.2 of the side wall regions 68.1, 68.2 do not have an internal thread. In this exemplary embodiment, the bracing of the side wall regions 68.1, 68.2 for producing the clamping force takes place via a screw 50.2 which is guided through the transverse recess 62.1, 62.2 and the screw head of which lies on the outer side against a side wall region 68.1 and which is locked via a nut 52 screwed onto the outer side of the opposite wall region 68.2. The production of the clamping force also takes place here by simple screwing together of the screw 50.2 to the nut 52.

The invention claimed is:

1. A device for triggering a gas spring, comprising:
an actuating device;
an actuating element which is operatively connected to the actuating device and acts on an end-side trigger of the gas spring;
a housing, the housing having a gas spring connection recess via which an upper end region of the gas spring can be connected to the housing while the trigger reaches into an interior of the housing, the gas spring connection recess being formed as a continuous recess; and
a clamping element configured to releasably clamp and fix the upper end region of the gas spring at an adjustable position in the gas spring connection recess,
wherein the housing has an open slot which extends from the gas spring connection recess to a front outer side of the housing over at least a part of a length of the gas spring connection recess,
wherein a left projecting side wall region and a right projecting side wall region are formed by the slot,
wherein in the region of the slot the left projecting side wall region and the right projecting side wall region have transverse openings which are aligned with each other,
wherein the clamping element is guided through the transverse openings,
wherein the clamping element is arranged at the left projecting side wall region and the right projecting side wall region and braces the left projecting side wall region and the right projecting side wall region together, whereby a clamping force is exerted on the end region of the gas spring that is inserted into the gas spring connection recess,
wherein the gas spring connection recess is formed as continuous recess with an internal thread configured to mesh with an external thread formed at the upper end region of the gas spring, and
wherein the gas spring connection recess does not limit an upper position of the gas spring.

2. The device as in claim 1, wherein the slot extends over the entire length of the gas spring connection recess.

3. The device as in claim 1,
wherein the clamping element is formed as a screw and
wherein at least one of the transverse openings has an internal thread in which an external thread of the screw engages.

4. The device as in claim 3,
wherein the screw ends on an outer side substantially with an outer wall of the left projecting side wall region or the right projecting side wall region, and
wherein a screw head of the screw is arranged in a recess of the opposite projecting side wall region.

5. The device as in claim 3, wherein a screw head of the screw has a form-fitting internal contour for attaching a tool.

6. The device as claimed in claim 1, wherein the clamping element is formed as a screw with a nut.

7. The device as in claim 6, wherein a screw head of the screw and the nut each lie against an outer side of the left projecting side wall region and the right projecting side wall region respectively.

8. The device as in claim 6, wherein a screw head of the screw has a form-fitting internal contour for attaching a tool.

9. The device as in claim 1,
wherein the actuating device is a Bowden cable.

10. The device as in claim 9,
further comprising a threaded housing connection unit recess configured to receive the Bowden cable.

11. The device as in claim 1,
wherein the slot and the actuating device are arranged on opposite sides of the gas spring.

12. The device as in claim 1,
wherein the internal thread extends to an upper end of the gas spring connection recess.

13. The device as in claim 1,
wherein the external thread formed at the upper end region of the gas spring extends upwardly beyond the slot.

14. The device as in claim 1,
wherein a longitudinal axis of the gas spring connection recess and a longitudinal axis of the actuating element are parallel.

15. A seat, comprising:
an adjustable backrest;
a gas spring operatively connected to the adjustable backrest and configured to lock a rotational movement of the backrest; and
the device as in claim 1 for triggering the gas spring.

\* \* \* \* \*